(12) United States Patent
Edala et al.

(10) Patent No.: US 10,007,650 B2
(45) Date of Patent: *Jun. 26, 2018

(54) METHODS AND SYSTEMS FOR ANNOTATING ELECTRONIC DOCUMENTS

(71) Applicant: LexisNexis, a division of Reed Elsevier Inc., Miamisburg, OH (US)

(72) Inventors: Narasimha R. Edala, Dublin, OH (US); Donald Loritz, Springboro, OH (US); Srinivas Edala, Springboro, OH (US); Patrick Simpson, Christiansburg, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/995,581

(22) Filed: Jan. 14, 2016

(65) Prior Publication Data

US 2016/0132479 A1    May 12, 2016

Related U.S. Application Data

(63) Continuation of application No. 12/874,313, filed on Sep. 2, 2010, now Pat. No. 9,262,390.

(51) Int. Cl.
*G06F 17/00* (2006.01)
*G06F 17/24* (2006.01)
(Continued)

(52) U.S. Cl.
CPC ........ *G06F 17/241* (2013.01); *G06F 17/2211* (2013.01); *G06F 17/2235* (2013.01);
(Continued)

(58) Field of Classification Search
CPC ............... G06F 17/241; G06F 17/2211; G06F 17/2235; G06F 17/242; G06F 17/277;
(Continued)

(56) References Cited

U.S. PATENT DOCUMENTS 5,708,845 A    1/1998   Wistendahl et al.
5,819,260 A   10/1998   Lu et al.
(Continued)

OTHER PUBLICATIONS

PR Newswire, "Medialink and iSurfTV introduce Internet-Based Video With Interactive Embedded Hyperlinks," New York, Sep. 28, 1999, 2 pages.
(Continued)

*Primary Examiner* — Nathan Hillery
(74) *Attorney, Agent, or Firm* — Dinsmore & Schohl LLP

(57) ABSTRACT

A computer-implemented method of annotating an electronic document may include receiving annotation information corresponding to a first electronic document file and creating annotation metadata that is associated with the annotation information. The method may further include storing the annotation information and associated annotation metadata in an annotation file that is separate from the first electronic document file, and anchoring the annotation information to a target electronic document file at an anchor location corresponding to the annotation metadata. The annotation metadata may be generated by assigning a target offset value to individual neighboring tokens defining an annotation neighborhood, wherein the target offset values correspond to positions of the neighboring tokens with respect to an annotation location within the first electronic document file. The annotation metadata may also comprise topographic patterns that are compared between source and target documents to determine the anchor location.

10 Claims, 9 Drawing Sheets

(51) Int. Cl.
*G06F 17/30* (2006.01)
*G06F 17/27* (2006.01)
*G06F 17/22* (2006.01)
*G06K 9/00* (2006.01)

(52) U.S. Cl.
CPC .......... *G06F 17/242* (2013.01); *G06F 17/277* (2013.01); *G06F 17/2785* (2013.01); *G06F 17/30011* (2013.01); *G06F 17/30014* (2013.01); *G06F 17/3053* (2013.01); *G06F 17/3071* (2013.01); *G06F 17/30616* (2013.01); *G06F 17/30705* (2013.01); *G06F 17/30722* (2013.01); *G06F 17/30731* (2013.01); *G06F 17/30997* (2013.01); *G06K 9/00463* (2013.01); *G06K 9/00469* (2013.01); *G06K 9/00483* (2013.01)

(58) Field of Classification Search
CPC .......... G06F 17/2785; G06F 17/30011; G06F 17/30014; G06F 17/3053; G06F 17/30616; G06F 17/30705; G06F 17/3071; G06F 17/30722; G06F 17/30731; G06F 17/30997; G06K 9/00463; G06K 9/00469; G06K 9/00483
See application file for complete search history.

(56) References Cited

U.S. PATENT DOCUMENTS

| | | |
|---|---|---|
| 6,006,265 A | 12/1999 | Rangan et al. |
| 6,154,771 A | 11/2000 | Rangan et al. |
| 6,175,840 B1 | 1/2001 | Chen et al. |
| 6,266,684 B1 | 7/2001 | Kraus et al. |
| 6,349,296 B1 | 2/2002 | Broder et al. |
| 6,496,981 B1 | 12/2002 | Wistendahl et al. |
| 7,028,267 B1 | 4/2006 | Beezer et al. |
| 7,207,006 B1 | 4/2007 | Feig et al. |
| 7,260,600 B1 | 8/2007 | Dunn et al. |
| 7,269,787 B2 | 9/2007 | Amitay et al. |
| 7,555,489 B2 | 6/2009 | Bell et al. |
| 7,555,705 B2 | 6/2009 | Chen et al. |
| 7,568,168 B2 | 7/2009 | Beezer et al. |
| 7,734,631 B2 | 6/2010 | Richardson et al. |
| 7,770,102 B1 | 8/2010 | Wolff et al. |
| 7,779,347 B2 | 8/2010 | Christiansen et al. |
| 2003/0172066 A1 | 9/2003 | Cooper et al. |
| 2003/0182282 A1 | 9/2003 | Ripley |
| 2004/0078757 A1 | 4/2004 | Golovchinsky et al. |
| 2004/0088652 A1 | 5/2004 | Abe et al. |
| 2004/0093323 A1 | 5/2004 | Bluhm et al. |
| 2004/0261016 A1 | 12/2004 | Glass et al. |
| 2005/0055345 A1 | 3/2005 | Ripley |
| 2005/0060643 A1 | 3/2005 | Glass et al. |
| 2005/0160355 A1 | 7/2005 | Cragun et al. |
| 2005/0165747 A1 | 7/2005 | Bargeron et al. |
| 2005/0165852 A1 | 7/2005 | Albornoz et al. |
| 2006/0023945 A1 | 2/2006 | King et al. |
| 2006/0029296 A1 | 2/2006 | King et al. |
| 2006/0101069 A1 | 5/2006 | Bell et al. |
| 2007/0005589 A1 | 1/2007 | Gollapudi |
| 2007/0136656 A1 | 6/2007 | Nydam et al. |
| 2007/0208703 A1 | 9/2007 | Shi et al. |
| 2008/0201632 A1 | 8/2008 | Hong et al. |
| 2008/0215563 A1 | 9/2008 | Shi et al. |
| 2009/0012984 A1 | 1/2009 | Ravid et al. |
| 2009/0024606 A1 | 1/2009 | Schilit et al. |
| 2009/0049062 A1 | 2/2009 | Chitrapura et al. |
| 2009/0157597 A1 | 6/2009 | Tiyyagura |
| 2009/0222441 A1 | 9/2009 | Broder et al. |
| 2009/0240680 A1 | 9/2009 | Tankovich et al. |
| 2009/0254572 A1 | 10/2009 | Redlich et al. |
| 2009/0271381 A1 | 10/2009 | Beezer et al. |
| 2009/0300014 A1 | 12/2009 | Chakrabarti et al. |
| 2010/0030859 A1 | 2/2010 | Huang |
| 2010/0114890 A1 | 5/2010 | Hagar et al. |
| 2010/0169329 A1 | 7/2010 | Frieder et al. |
| 2010/0313114 A1 | 12/2010 | Colbran |
| 2010/0325131 A1 | 12/2010 | Dumais et al. |
| 2011/0029491 A1 | 2/2011 | Joshi et al. |
| 2011/0055332 A1 | 3/2011 | Stein |
| 2011/0238632 A1 | 9/2011 | Vandervort et al. |
| 2011/0276523 A1 | 11/2011 | Brdiczka et al. |

OTHER PUBLICATIONS

PCT International Search Report, dated Jan. 13, 2012.

110

Xxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxx.
Xxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxx.        130
Xxxxxxxxxxxxxxxxxxxxxxxxxxxxxxxxxxxxxx    ┌─────────┐
xxxxxxxxxxxxxxxxxxxxxxxxxxxxxxxxxxxxxxx   │ CORRECT │
xxxxxxxxxxx.    133                        │ ANIMAL? │
The quick brown │wolf│ jumped over the lazy dog.
Xxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xx.
Xxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxx
xxxxx.

111
http://www.lucy83.com/storyreviews/GreatCanine.html

FIG. 5B

METHODS AND SYSTEMS FOR ANNOTATING ELECTRONIC DOCUMENTS

CROSS-REFERENCE TO RELATED APPLICATIONS

This application is a continuation of U.S. application Ser. No. 12/874,313, filed on Sep. 2, 2010 and entitled "Methods and Systems for Annotating Electronic Documents."

TECHNICAL FIELD

The present specification generally relates to methods for annotating electronic documents and, more specifically, to methods and systems for comparing electronic documents and anchoring annotations associated with a source document at an anchored position within a target document.

BACKGROUND

People often collaborate in creating and reviewing documents through annotations, which are overlaid information comments anchored in place over underlying snippets of text or images in office productivity applications, such as word processor programs. Traditionally, two collaboration models have been used: a single-file model and a file-broadcast model. In the single-file model, all collaborators are assumed to work on the same underlying file. Collaborators may relay control of the underlying file via e-mail or a check-in/check-out document management system to add annotations in an orderly manner until the control of the document cycles back to the originator. However, the single-file model presents time and zonal conflicts. Because annotations are anchored in the document to underlying text, simultaneous editing of text by multiple collaborators may lead to annotation conflicts. To preserve comments from one collaborator to another, comments must be changed sequentially such as to not lose changes made by one collaborator over the other.

In the file-broadcast model, the originator of the document is presumed to have distributed the original file either by broadcasting the file to all collaborators through e-mail or via a public forum, such as a Wiki or a message board. Collaborators work on their own copy of the file and propagate annotations back to the originator and the originator then consolidates the feedback. However, the file broadcast model may present annotation-file binding implications. Annotations from two versions of a document with two different owners, separated in space and time, cannot be consolidated until the end of the collaboration life-cycle because annotations are anchored physically in the file. Such physical binding may require either a manual or automated consolidation operation at the end of the collaborative life-cycle by the originator of the document. The file-broadcast model may also present in-progress access control and anchorability implications. If annotation consolidation is desired by anyone other than the originator of the document, post peer-to-peer relationships must be established which can become complex.

Accordingly, a need exists for alternative methods for annotating electronic documents.

SUMMARY

In one embodiment, a computer-implemented method of annotating an electronic document includes receiving annotation information corresponding to a first electronic document file and creating annotation metadata that is associated with the annotation information The method may further include storing the annotation information and associated annotation metadata in an annotation file that is separate from the first electronic document file, and anchoring the annotation information to a target electronic document file at an anchor location corresponding to the annotation metadata.

In another embodiment, a computer-implemented method of comparing electronic documents includes creating a first document signature of a first electronic document and creating a second document signature of a second electronic document. The first document signature may be compared to the second document signature to generate a document similarity value. The document similarity value may be compared to a threshold similarity value, wherein the first and second electronic documents are compatible documents if the document similarity value is greater than the threshold similarity value.

In yet another embodiment, a computer-implemented method of annotating an electronic document includes receiving annotation information corresponding to an annotation of a first electronic document file at an annotation location, generating annotation metadata associated with the annotation information by creating topographic patterns corresponding to the first electronic document file and the annotation information, wherein the topographic patterns of the first electronic document file include document patterns, anchor patterns, neighborhood patterns, or combinations thereof, and storing the annotation information and associated annotation metadata in an annotation file that is separate from the first electronic document file. The method further includes generating topographic patterns corresponding to a target electronic document file, wherein the topographic patterns of the target electronic document file include document patterns, anchor patterns, neighborhood patterns, or combinations thereof. The topographic patterns of the first electronic document file may be compared to the topographic patterns of the target electronic document file to determine an anchor location within the target electronic document file, and the annotation information anchored, by a computer device, to the target electronic document file.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 5B depicts a representation of a target electronic document having anchored annotation information associated therewith according to one or more embodiments shown and described herein;

DETAILED DESCRIPTION

Embodiments described herein may enable a plurality of collaborators working in a collaboration group or forum to create and share annotations amongst multiple documents. Annotations made by one collaborator in one electronic document may be shared with another collaborator working or viewing another electronic document. More specifically, annotations created in one document at a particular annotation location may be anchored to the other electronic document at a location that is substantially similar to the annotation location of the first document. Because the annotation information is stored separately from the electronic documents, the annotations may be selectively shared amongst the collaborators.

More specifically, annotation information may be received and associated with one or more electronic documents at an annotation location. The annotation information and annotation metadata associated with the annotation information may be stored in one or more files that are separate from the one or more electronic documents. The annotation information may then be anchored to a target electronic document at one or more anchor locations in accordance with the annotation metadata. Various embodiments of methods and systems for annotating electronic documents will be described in more detail herein.

Figure 1:
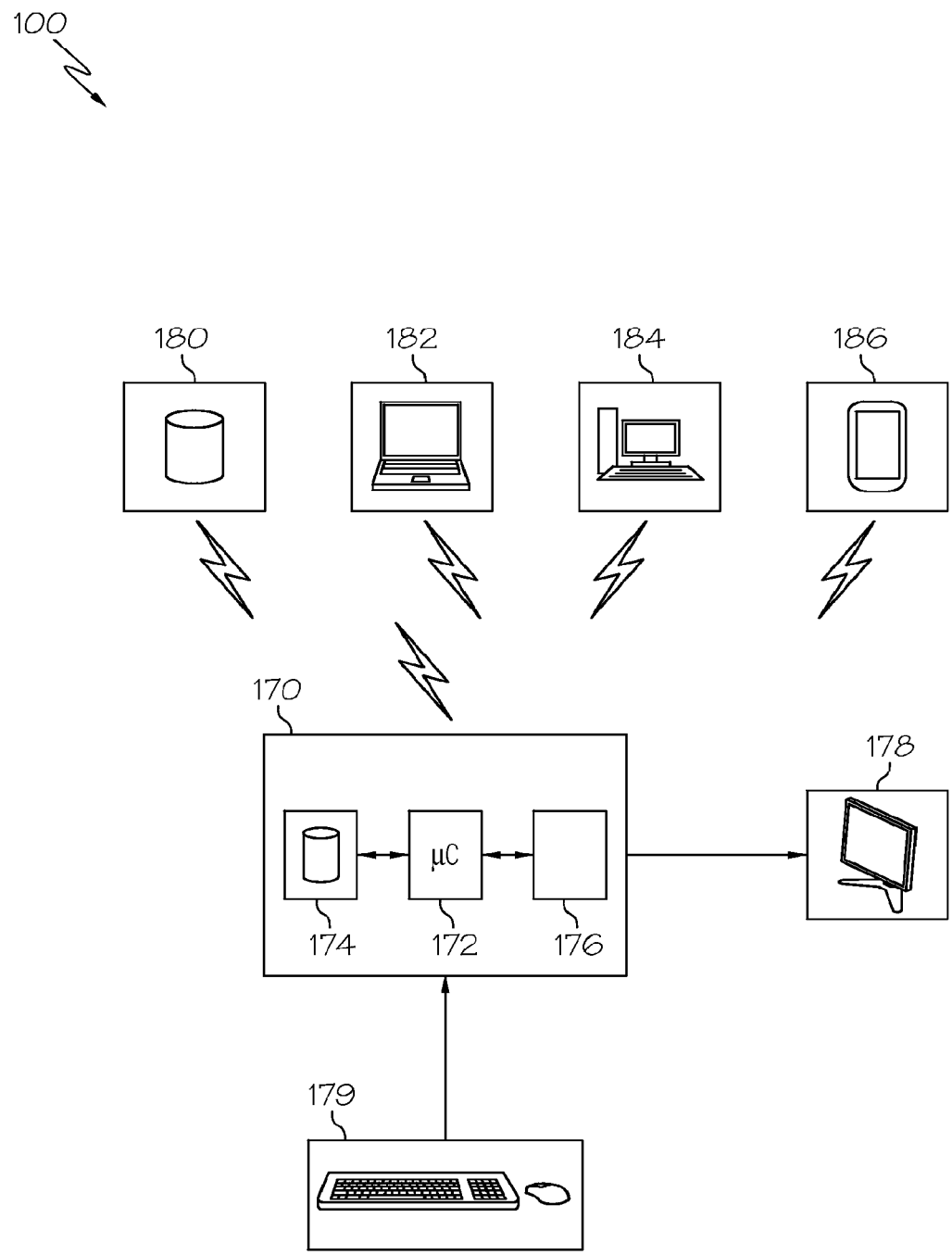
FIG. 1 depicts a schematic illustration of an annotation management system according to one or more embodiments shown and described herein.

Referring now to FIG. 1, embodiments described herein may be implemented in a computer annotation management system 100. As described later herein, collaborators (i.e., users) may utilize the computer annotation management system 100 to create and share annotation information amongst each other. FIG. 1 illustrates an exemplary system comprising a computer 170 having a graphical display 178 and a user input device 179 coupled thereto. The computer 170 may be a personal computer such as a desktop, laptop, smart phone, tablet computing device, or a server within an enterprise network, for example. The graphical display 178 may be a display monitor such as an LCD computer monitor, and the user input device 179 may be a mouse and a keyboard, or a touch screen of the graphical display.

The computer has a processor 172 that is electrically coupled to storage medium devices 174/175 and a memory 176. The computer 170 may have any number of memory and/or storage mediums for the storage of data and software programs. The storage medium devices 174/175 may be configured as an internal or external hard drive, an optical drive, flash drive or other similar storage device. Stored within the memory 176 or storage medium devices 174/175 (or other internal or external computer readable media) may be software programs comprising computer executable instructions 177 that, when executed by the processor 172, cause the computer 170 to perform various functions of the annotation methods described herein below. The computer 170 may also be communicably coupled to a remote storage device 180 by a wired connection such as an Ethernet connection, or by a wireless communications network over the Internet or an enterprise intranet.

A user of the computer annotation management system 100 may utilize the graphical display 178 and user input device 179 to perform the methods for annotating electronic documents that are described herein. Further, a plurality of users may use remote devices, such as a laptop 182, a desktop computer 184 and/or a smart phone 186, for example, to interact with the computer annotation management system 100. In one embodiment, the computer 170 is a server that the remote devices 182, 184, and 186 may communicate with to execute annotation tasks of the embodiments described herein. The remote devices may be coupled to the computer 170 hosting the computer executable instructions 177 and storage medium 174 via a communications network as described above. Users may access the computer 170 (or local executable instructions stored on the remote devices) by a word processing program, a propriety portal program, or by accessing a webpage through an internet browser, for example. As described in more detail below, annotation information and electronic documents may be stored in the storage medium devices 174/174 within the computer 170, or locally on the remote devices themselves.

Figure 2:
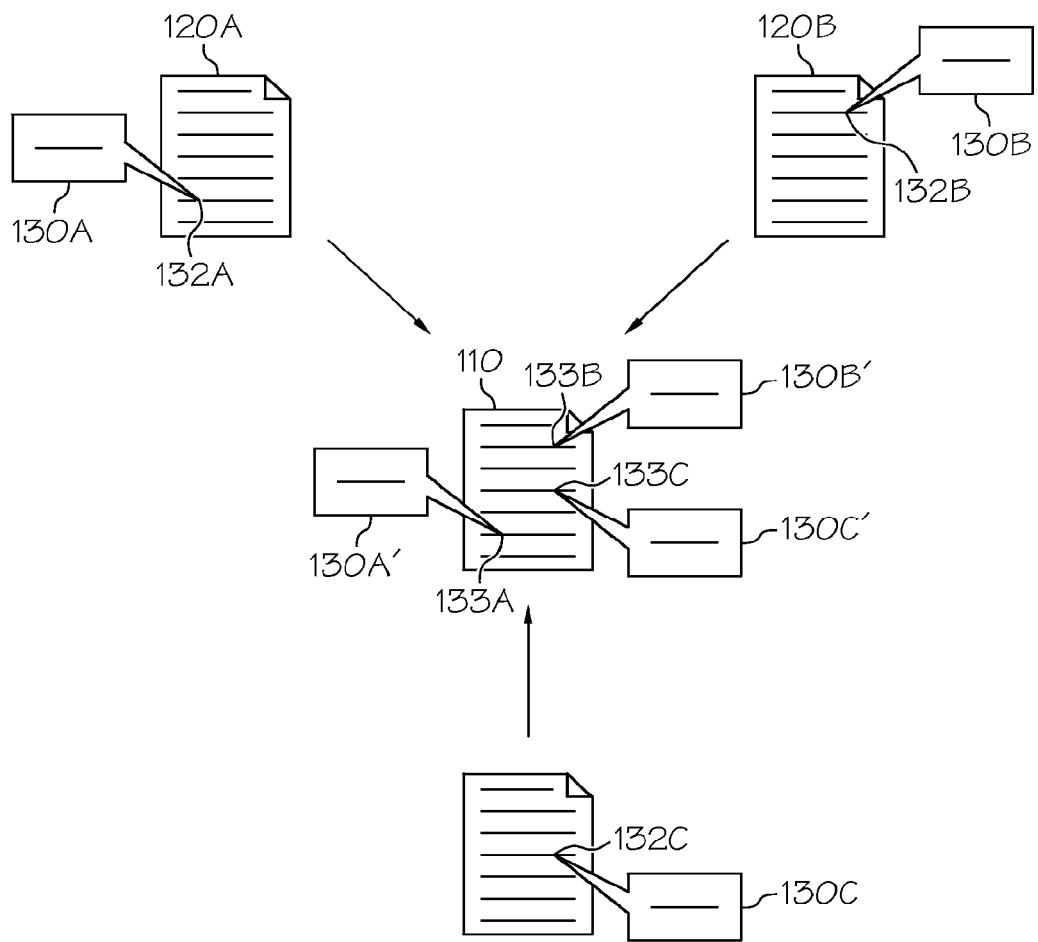
FIG. 2 depicts a schematic illustration of a method of annotating an electronic document according to one or more embodiments shown and described herein.

Generally, referring to FIG. 2, embodiments described herein may enable users to create annotations 130A-130C in source electronic documents 120A-120C at annotation locations 132A-132C, and share those annotations with other users by anchoring the annotations 133A'-133C' at anchor locations 133A-133C within a target electronic document 110. For example, source document 120A may have annotation information 130A (e.g., text of an annotation or comment) entered by a first user at annotation location 132A, source document 120B may have annotation information 130B entered by a second user at annotation location 132B, and source document 120C may have annotation information 130C entered by a third user at annotation location 132C. It should be understood that any number of users may contribute any number of annotations and source documents.

The anchor locations 133A-133C within the target document 110 correspond to the respective annotation locations 132A-132C within the source documents. Therefore, annotation information provided by a plurality of users may be merged into a single target document during a collaborative process. Because the annotations 130A-130C are stored separately from the source and target document files in separate annotation files (i.e., the annotations are not stored within the electronic document files themselves), the annotations 130A-130C may be selectively associated with the target document 110 at the correct anchor locations 133A-133C that correspond to the respective annotation locations 132A-132C in the source files 120A-120C. Hence, users may create annotations in their own documents and then share those annotations with other users by the proper anchoring of the annotations into the documents of their peers. In this manner, users may view their own annotations as well as the annotations of others.

Embodiments described herein also enable the ability to anchor annotations to and from source and target documents across multiple document file-format platforms. As an example and not a limitation, annotations may be shared amongst file formats such as Microsoft® Word® ("DOC files"), Adobe® Portable Document Format ("PDF files"), web page files ("html files"), and many others. Further, embodiments described herein may enable the ability to share annotations between source and target documents that vary in content. For example, the content of a target document may have changed from the original content of a source file (e.g., a user may have edited the target document after the creation of the source electronic file). Despite the difference in content between source and target documents, embodiments may accurately anchor annotations into the proper anchor location in the target document.

Figure 3:
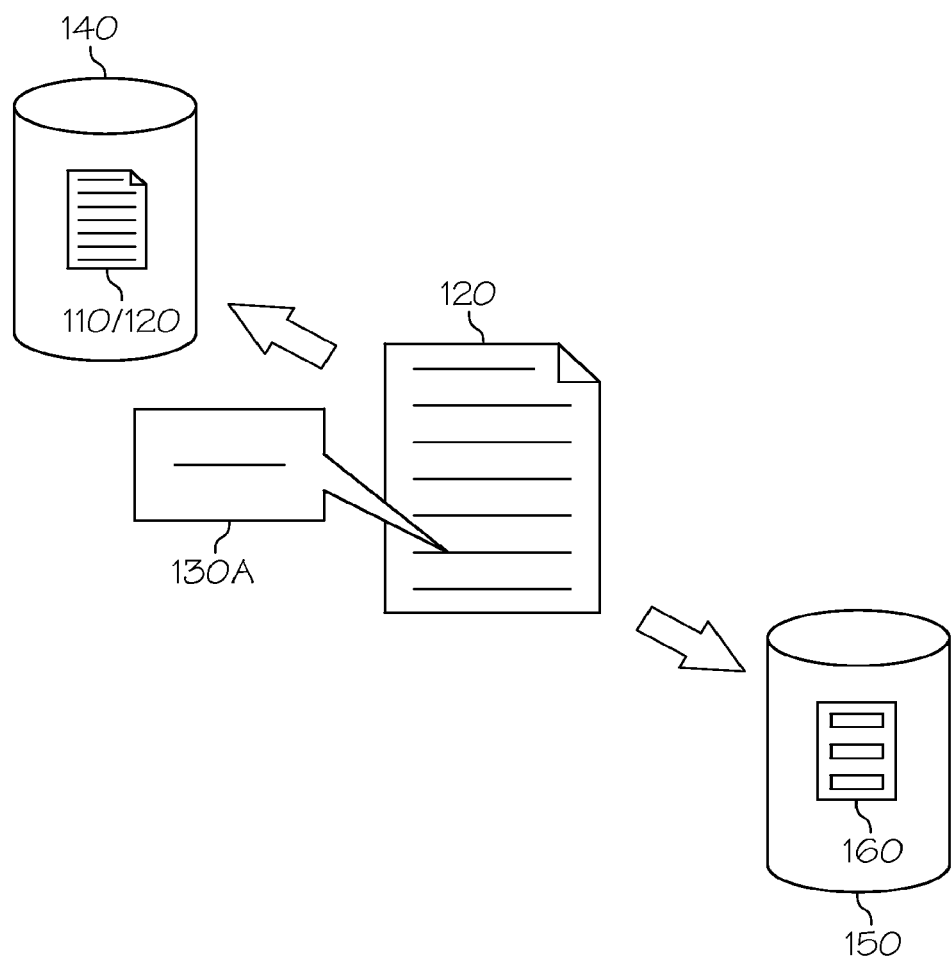
FIG. 3 depicts a schematic illustration of disassembly of annotation information and an electronic document in an annotation management system according to one or more embodiments shown and described herein.

FIG. 3 schematically illustrates a source document 120 (e.g., a source electronic document file, or a first electronic document file) having annotation information 130A associated therewith in a disassembly process. To allow annotations from multiple users and/or sources be merged into one or more target documents, the annotation information 130A and the source document 120 are physically separated and stored in separate files. For example, the source document 120 may be stored in a document management system 140 that resides on the storage medium 174 of the computer 170 along with a plurality of other electronic documents. The annotation information 130A may be compiled into a separate and distinct annotation file 160 that is stored in an annotation management system database 150, which may reside on the storage medium 175. It should be understood that the electronic documents and annotation files may be stored on the same or different storage mediums and that the embodiments described herein are not limited to storing the electronic documents and annotation files on separate physical storage mediums.

Figure 4:
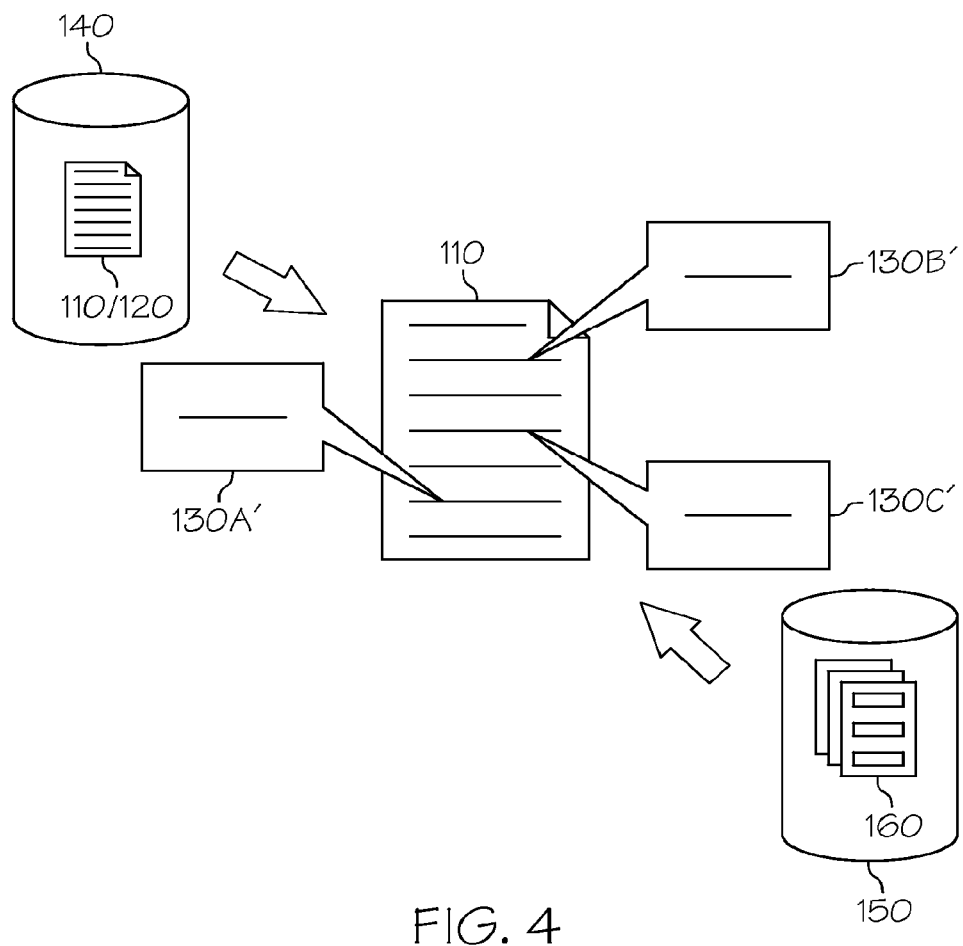
FIG. 4 depicts a schematic illustration of reassembly of annotation information and an electronic document in an annotation management system according to one or more embodiments shown and described herein.

FIG. 4 schematically illustrates a target document 110 (e.g., a target electronic document file, or a second electronic document file) in an anchoring or reassembly process in which annotation information 130A'-130C' from various source documents is anchored to the target document 110. The target document 110 may reside in a document management system as illustrated in FIG. 4 or at another location. At the time of anchoring, annotation information that has been written to the annotation files 160 and is compatible with the target document 110 may be obtained from the annotation management system (e.g., from storage medium 175). As described in more detail below, compatible annotation information means annotation information that is associated with a source document and/or similar in content to the target document at the passage level such that the two document are related (e.g., share the same parent electronic document, or one is a derivative of the other). The annotation information 130A associated with the source document 120 illustrated in FIG. 3 has been anchored to the target document 110 illustrated as anchored annotation information 130A'. Similarly, anchored annotation information 130B' and 130C' has been anchored from source documents other than the source document 120 illustrated in FIG. 3. In this manner, annotations from multiple source documents may be anchored to a target document and shared amongst users during a collaboration process.

Figure 5A:
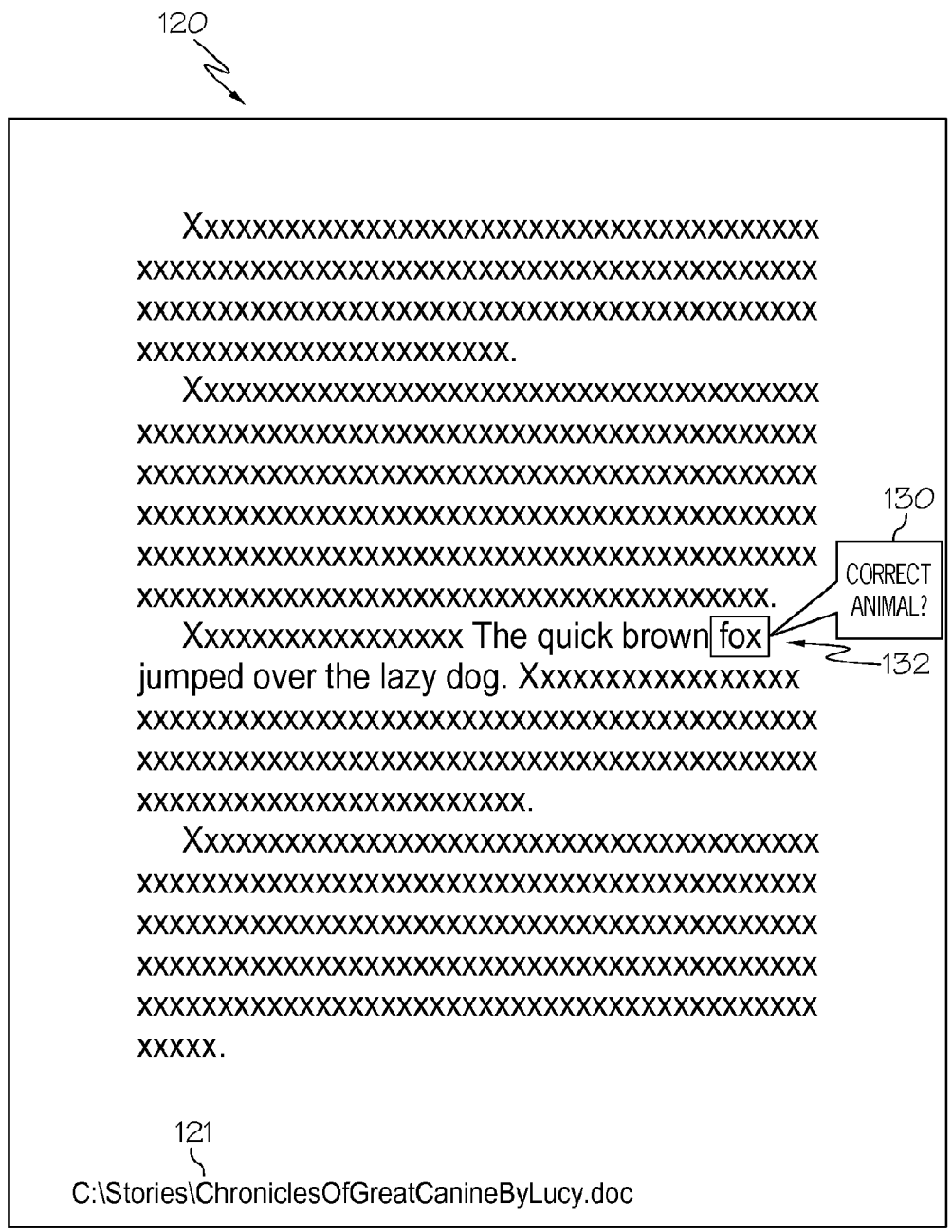
FIG. 5A depicts a representation of a source electronic document having annotation information associated therewith according to one or more embodiments shown and described herein.

As an example and not a limitation, FIG. 5A illustrates a graphical representation of a source document 120 of a particular user (e.g., a user within a collaboration group or forum). As indicated by the file path 121, the source document 120 is configured as a DOC file. The source document 120 may reside locally on the remote device of the user, on an enterprise server that maintains a document management system database 140, or on a cloud server within a cloud computing system, for example. As illustrated in FIG. 5A the source document 120 has four paragraphs and a sentence "The quick brown fox jumped over the lazy dog" positioned as the second sentence of the third paragraph. The user has provided an annotation 130 at annotation location 132 that corresponds with the word "fox." The annotation text "Correct animal?" is the annotation information that is associated with the particular annotation 130.

FIG. 5B illustrates a graphical representation of a target document 110 of a different user than the source document 120 associated with the user with respect to FIG. 5A. As described below, the annotation information may be shared between the user of the source document 120 and the user of the target document 110. As indicated by the file path 111, the target document 110 is configured as an html file. The target document 110 may also reside in the locations described above with respect to the source document 120. Not only does the target document 110 differ from the source document 120 in format, it also differs in content. The target document 110 has five paragraphs as opposed to the four paragraphs of the source document. Further, the annotated sentence within the target document 110 now reads "The quick brown wolf jumped over the lazy dog" as the first sentence of the fourth paragraph as compared to the annotated sentence of the source document 120. As illustrated in FIG. 5B, the annotation information 130' is anchored at an anchor location 133 corresponding to the word "wolf" in the target document 110 that correctly corresponds with the annotation location 132 of the source document 120 using one or more of the annotation methods described herein. The annotation is correctly anchored into the target document despite that the format between the two documents is different, the content between the two documents has changed, and the annotated sentence has also changed. As such, the annotation to the word "fox" by the first user working on the source document may be shared with the second user working on the target document.

Systems and methods of annotating electronic documents will now be described in greater detail by reference to the flowcharts of FIGS. 6-8. Generally, as described in more detail below, electronic documents (e.g., electronic documents within a collaboration pool, or electronic documents stored within a document management system) may be compared with one another to determine whether or not the electronic document are compatible with one another. If it is determined that electronic documents are compatible, annotations may be properly anchored and shared amongst the documents so that the relevant annotations created by the various collaborators may be collectively viewed. Alternatively, embodiments may not perform the document comparing step and rather attempt to determine the proper locations at which to anchor the annotations without comparing the documents at the document level.

Figure 6:
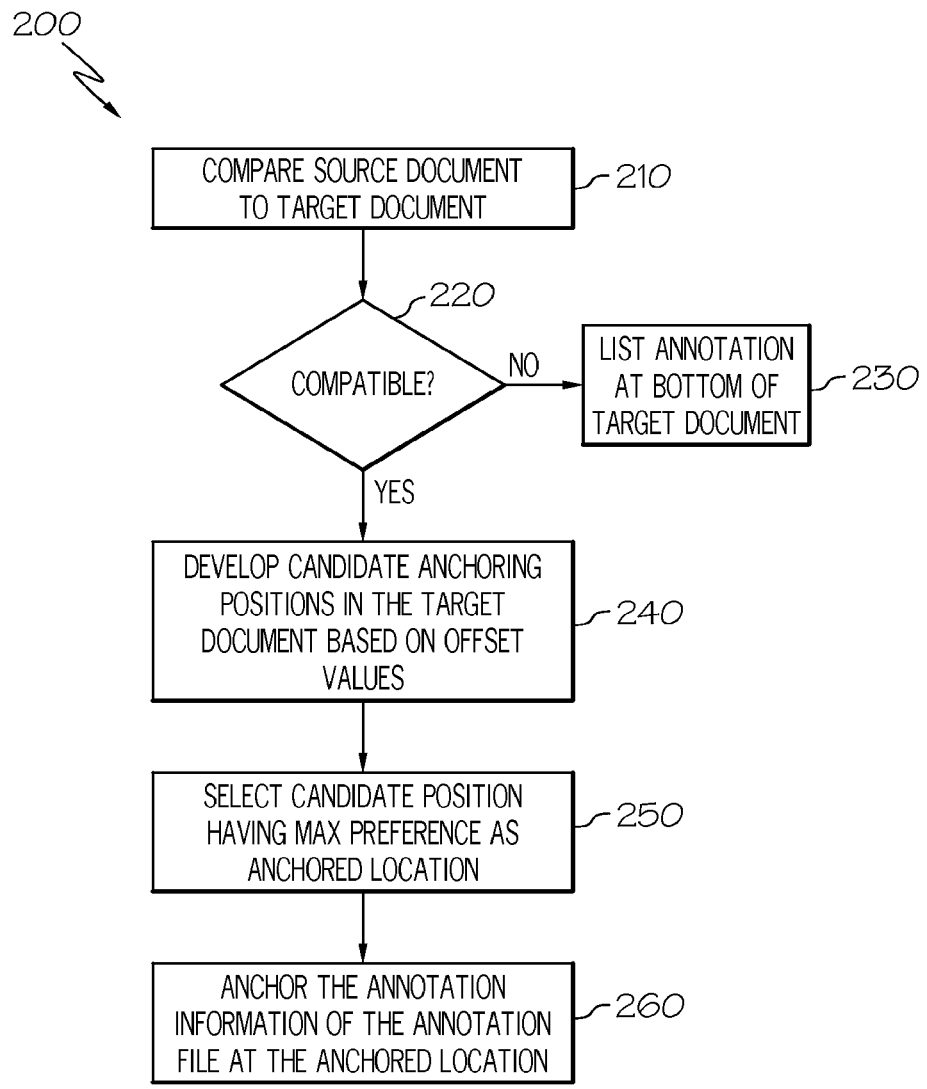
FIG. 6 depicts a flowchart illustration of a method of annotating an electronic document according to one or more embodiments shown and described herein.

Referring now to FIG. 6, a high level flowchart 200 of one embodiment for annotating an electronic document is illustrated. At block 210, a source document associated with annotation information to be anchored is compared with a target document. As described in more detail below with reference to FIG. 7, embodiments may generate document signatures for the source documents and target documents that may be stored in annotation files that are associated with such source and target documents. The document signatures within the annotation files may be compared rather than the documents themselves. A decision is made at block 220 as to whether or not the source document and target documents are compatible. If the two documents are not compatible, the annotation information may be positioned within the target document a generic location, such as at the bottom of the document (block 230).

In an alternative embodiment, the method of annotating an electronic document may not include the comparison between the source and target documents. In this embodiment, an anchoring of the annotation information may be attempted regardless of whether or not the source and target documents are compatible.

At blocks 240 and 250, potential anchoring positions of the annotation information are analyzed and an anchor location is selected based on a candidate anchoring position that is most likely to correspond with the annotation location of the source document. Annotation information originating in a source document should be re-attached or anchored at an appropriate zone with in the target document. Using neighboring tokens as heuristic topographic landmarks, embodiments determine the correct anchor location amongst many potential anchoring positions despite a source document and target document being separated by time, place, ownership and content variations, as described in more detail below with respect to FIG. 8. At block 260, the annotation information stored in the annotation file associated with the source document is anchored at the anchor location in the target document such that the user viewing the target document may see the annotation information provided in the source document at the correct location in the target document.

Comparing a source document or documents with a target document illustrated in blocks 210 and 220 in FIG. 6 will now be described in greater detail. Generally, documents should be derivative works of similar content or exact copies of one another for annotation in the target document to be beneficial to a user. If the documents are too different from one another, the annotations of the source document may not make sense when viewed in the context of the target document. Additionally, the source document and the target document may be so different in content such that there are no reasonable locations within the target document that correspond with the annotations provided in the source document. Therefore, embodiments described herein identify near and exact file-duplicates in a collection of documents and offer the ability to exchange annotations amongst the documents. The exchange of annotation information may be made within a system that provides for access control, authentication, and authorization permissions for annotation, owners and documents.

Although file metadata (e.g., version information and source information) stored within a document (or document file names) may be used to determine whether or not two documents are compatible, this information may be unreliable when a file is transmitted to multiple users and such users continually make changes to the document (e.g., change the text of the document, rename the document, and/or perform actions that affect the metadata stored within the document). To accurately match source documents to target documents, embodiments may generate a document signature for each annotation that is particular to the annotation and the source document. The document signature may be stored in an annotation file that is associated with the source file. As an analogy, the generated document signature acts as a DNA fingerprint of the underlying text (or metadata) of the document. This DNA fingerprint may be compared with other DNA fingerprints within an annotation management system to determine matches between documents. In this manner, the document signatures within the annotation files may be compared to match documents rather than a cumbersome and resource-intensive word-for-word comparison between documents. As described in more detail below, document signatures in the form of topographic patterns may be used to not only match documents, but also determine the exact anchor locations within target documents.

Figure 7:
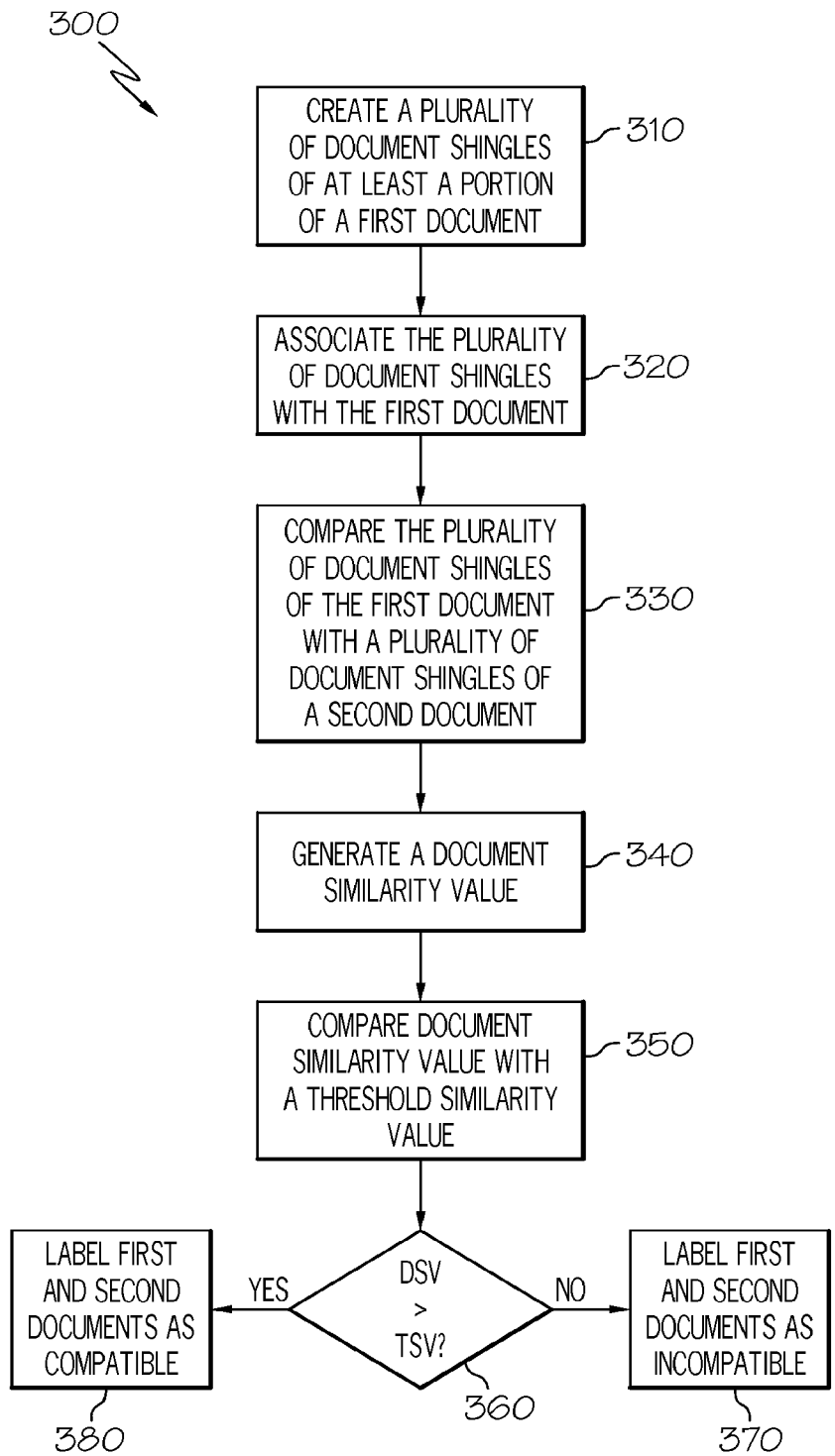
FIG. 7 depicts a flowchart illustration of a method of comparing a first document to a second document according to one or more embodiments shown and described herein.
Figure 8:
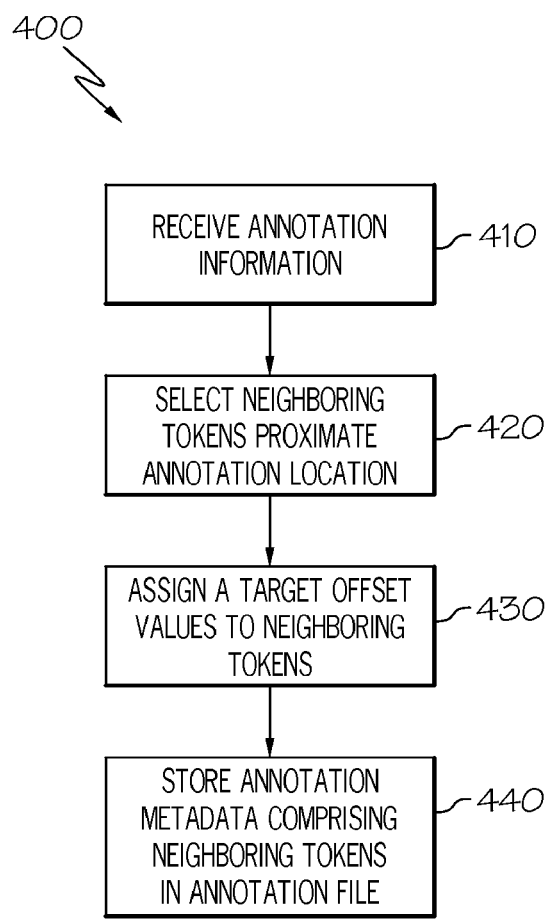
FIG. 8 depicts a flowchart illustration of a method of creating annotation metadata according to one or more embodiments shown and described herein.

Referring to FIG. 7, a flowchart 300 of one embodiment for the generation of document signatures and a comparison between document signatures is illustrated. At block 310, a document signature comprising a plurality of document shingles of at least a portion of a first document (e.g., a source document) is generated. Document shingles are groups of characters that represent the content (e.g., words in the text of the source document or characters stored in metadata) of the source document. The document shingles may be generated by many different methodologies. For example, document shingles may be derived from the text of a document by extracting first-character 4-grams (i.e., scanning for first characters of each term or word in the document) and then generating sequential four character grams of the first-character signature. As an example and not a limitation, the sentence: "A quick brown fox jumped over the lazy dog" of the source document illustrated in FIG. 5A would yield document shingles as follows: "qbfj," "bfjo," "fjot," "jotl," and "otld." Similarly, the sentence "A quick brown wolf jumped over the lazy dog" of the target document illustrated in FIG. 5B would yield document shingles as follows: "qbwj," "bwjo," "wjot," "jotl," and "otld." Therefore, the document shingles between the two documents are slightly different.

Other methodologies may also be utilized to generate the document shingles. In the example described above, the character position (i.e., first letter) of each word is used to generate the document shingles because the first letter of a word tends to change the least when modifications are made. Other character positions may be chosen such as the last character position, the second character position, or others. Alternatively, document shingles may be based on multiple characters of a single word, or single or multiple characters of every other word or some predefined pattern, for example.

To save storage space, document shingles may be generated only proximate to the area that the annotation was made. In one embodiment, the document signature is generated when an annotation is made to the source document. In the above example, more document shingles may be generated based on sentences before and after the annotation at the word "fox." Alternatively, document shingles may be generated for the entire document, or particular regions of a source document (e.g., at the annotation location, at the beginning of the document, at the end of the document, etc.). When evaluating a target document that does not have an annotation, document shingles may be extracted from the entire document (or portions of the document) and stored in a shingle file so that the annotation shingles associated with the source document may be compared with the shingles of the target document's shingle file.

The shingles that make up the document signature and the shingles that make up an annotation signature may be created every time an annotation is made to a source document. The document shingles may then be associated with the source document at block 320 by being stored along with the annotation information and annotation metadata (described in detail below) in the annotation file for later comparison with target documents. Additional information regarding the source document may also be stored within the annotation file, such as document metadata information and file name information, to increase the accuracy of the comparison between documents.

At block 330, the document shingles associated with the first document (e.g., a source document) are compared with the document shingles of the second document (e.g., a target document). The executable instructions may scan the document shingles in each annotation file. At block 340, a document similarity value that is based on the similarity of the content of the documents is generated. The document similarity value indicates a level of compatibility between documents. Documents having many document shingles that match one another may be assigned a high document similarity value whereas documents having few or no document shingles that match one another may be assigned a low document similarity value. A target document may have many minor variations such as shifted paragraphs, word-alterations, etc., but the generated shingles should not alter significantly.

At block 350, the document similarity value may be compared with a threshold similarity value that sets the threshold as to whether or not documents are compatible with one another. The threshold similarity value may be used as a filtering criterion to prevent false annotation hits. A decision is made at block 360 to determine if the document similarity value is greater than the threshold similarity value. If the document similarity value is less than the threshold similarity value at block 360, the first and second documents may be labeled or otherwise indicated as incompatible with one another at block 370. If the document similarity value is greater than the threshold similarity value at block 360, the first and second documents may be labeled or otherwise indicated as compatible with one another at block 380.

The process may continue at block 220 in the flowchart 200 of FIG. 6. If the metadata and the documents shingles suggest that two documents are derivative works of the same document (i.e., compatible), annotations may be incorporated by utilizing the process described above with respect to blocks 240, 250 and 260 and described in more detail below. However, if the two documents have morphed in text to such an extent that the document shingles are substantially different (even when the metadata suggests that the two documents are derivative works of the same document), proper anchor locations may not be successfully determined with a threshold confidence level (i.e., the documents are incompatible). As stated above, if the documents are incompatible and a user still wishes to view the annotations of the source document within the target document, the annotation information from the source document may be viewable as orphaned annotations at a generic location within the target document, such as at the bottom of the document (block 230). As an example, the above-described comparison of electronic documents may be used by a collaborator to view only those annotations of electronic documents within the collaboration pool or forum that are related to the user's document.

In this manner, annotations from one document may be exchanged to another document having similar content by searching over the document shingles even in the absence of file metadata that definitively binds two documents to the same source. As an example and not a limitation, a first document may have been written and saved in a DOC file format and then posted on a webpage as an html file (or similar web file). A person may have then viewed the webpage and copied and pasted the text content from the webpage into another document, such as a DOC file or a PDF file, for example. In this case there would be no metadata to indicate that the two documents are related in content and are derivative documents. Using the methods described above, document signatures in the form of document shingles may be generated and compared to determine that the two documents are in fact compatible documents that may share annotation information.

After the documents have been compared and it has been determined that the documents are compatible with one another, the anchor locations of which to anchor the annotations into the target document may be calculated. It should be understood that the document comparison step is optional, and that anchor locations may be determined without comparing the documents at a document level, and that annotations may be anchored within documents that are not structurally similar/compatible to one another. Determining a proper anchor location for annotation information within a target document is described in greater detail with reference to FIGS. 6 and 8. As described above, physical separation of the annotations from the underlying document file into a separate annotation file may be used to successfully share and exchange annotations of multiple source documents if the proper anchor locations within a target document are determined. The methods described herein enable annotations of source files to be re-attached or anchored to a target document at an appropriate anchor location that corresponds to the location of the original annotation in the source document. By determining the proper anchor location, the annotation information in the target document may be visible at the intended location such that the annotations may be view in the proper context with respect to the surrounding text of the target document.

Annotations are commonly targeted at a specific text range within a document. If the original text of the document remains intact, offsets from the beginning or end of the document may be used to re-associate an annotation with a target document. However, in a file-broadcast collaboration model where one document file is sent to multiple collaborators, the collaborators cannot be assumed to retain their copies of the document file in the original state. Therefore, offset information of the target range may aid but cannot suffice to re-associate or anchor the annotation in the proper anchor location within the target document.

Embodiments described herein utilize neighboring tokens within the source and target documents as heuristic topographic landmarks for determining the proper position of the anchor location such that that the annotation may be successfully anchored to the target document. Referring now to the flowchart 400 of FIG. 8, annotation information may be received into the source document at block 410 (e.g., the source document illustrated in FIG. 5A). For example, the user may enter annotation text in the form of a comment at a particular annotation location in the source document. Using the source document 120 illustrated in FIG. 5A as an example, the user has entered the annotation text "Correct animal?" into an annotation that is positioned at the word "fox" (i.e., annotation location 132).

Neighborhood metadata stored in the annotation file may define an annotation neighborhood that is proximate to the annotation location 132. As described below, the neighborhood metadata may be used to place the annotation information into the correct anchor location within the target document 110. Referring to block 420 in FIG. 8, neighboring tokens are selected near the annotation location 132 to define the annotation neighborhood. In one embodiment, the neighboring tokens may comprise the words that surround the annotation location 132 within a certain target range. Using the sentence "A quick brown fox jumped over the lazy dog" from FIG. 5A as an example, neighboring tokens "a," "quick," "brown," "fox," "jumped," "over," "the," "lazy," and "dog" appear at positions one through nine, respectively. In the example, the neighboring token "fox" has been annotated. A target range of the annotation neighborhood may be established to encompass the base token "fox." For example, the target range may be set at five positions with the base token being centered in the target range. The target range may extend both before and after the annotated word for any number of positions. These neighboring tokens may be stored in the annotation file along with the annotation information, file metadata, document shingles associated with the annotation, or any other data, at block 440.

At block 430, target offset values are assigned to each of the neighboring tokens based on the respective position of the neighboring token within the target range. For example, the neighboring token "fox," being the base token, may be assigned a target offset value of "0," while the neighboring token "brown," being one position before the base token, may be assigned a target offset value of "−1." The neighboring tokens may be assigned target offset values as provided below:
  Neighbor 1: [token: "quick", target_offset: −2]
  Neighbor 2: [token: "brown", target_offset: −1]
  Neighbor 1: [token: "fox", target_offset: 0]
  Neighbor 1: [token: "jumped", target_offset: +1]
  Neighbor 1: [token: "over", target_offset: +2]
The target range of the annotation neighborhood may be increased to include more neighboring tokens, such as the words "a," "the," "lazy," and "dog," for example. The length of the target range may depend on the particular attributes of the documents that are sharing annotations. It should be understood that the target range of five is used for demonstrative purposes only and that much larger target ranges may be utilized. The target offset values and the associated neighboring tokens may be stored into the annotation file as at least part of the annotation metadata (block 440). In one embodiment, neighboring tokens occurring prior to the annotation location (e.g., a first direction) may be assigned a negative target offset values, and neighboring tokens occurring after the annotation location (e.g., a second direction) may be assigned a positive target offset value.

The annotation neighborhood is not limited to only textual landmarks. For example, the annotation neighborhood may include non-textual landmarks that may be present within the source document, such as structural elements like SGML markup, font information (e.g., bold, italics, etc.) and metadata within the document file, for example. Additionally, the target range of the annotation neighborhood does not need to be symmetric with respect to the annotation location. In one embodiment, the target range may be longer in one direction with respect to the target range than in the opposite direction. For example, the target range may not be symmetric when the annotation is made near the beginning or end of a document. Further, the target range does not need to be continuous. In the example described above, each consecutive word within the target range was selected as a neighboring token and assigned a target offset value. In one embodiment, not every word may be selected as a neighboring token such that the neighboring tokens are at discrete positions within the target range. As an example and not a limitation, words (or non-textual landmarks) appearing at the following positions may be selected as neighboring tokens: −30, −20, −10, −5, −1, 0, +1, +5, +10, +20, +30.

In the embodiment described above, words are assigned as neighboring tokens. In another embodiment, character-level neighboring tokens may be utilized and assigned target offset values rather than word-level neighboring tokens to achieve finer anchor resolution. The annotation neighborhood may also be captured by using n-gram characters such as the document shingles described above. Any unique combination of character-features that is consistent between the source document and the target document may be used as neighboring tokens to establish an anchor location.

The neighboring tokens of the annotation metadata may be utilized to properly anchor annotation information from the source document into a compatible target document so that a collaborator viewing the target document may view the shared annotation information in the correct context. However, the target document may have varied in content from the original source document. For example, the sentence of interest in the target document 110 illustrated in FIG. 5B now reads "A quick brown wolf jumped over the lazy dog." Therefore, the word "fox" that was annotated in the source document 120 does not appear in the target document 110. Further, the sentence does not appear in the same location in the target document 110 as in the source document 120. Although a target document may have been modified, it is very likely to have some, if not all, of the neighboring tokens as the source document. Further, it is not necessary for the neighboring tokens to appear in the immediate area in the target document as they did in the source document. In the illustrated example, the target document 110 has all of the neighboring tokens except for the base token "fox."

At block 240 of FIG. 6, candidate anchoring positions may be developed. The neighboring tokens in the annotation file may be used to make a preliminary assessment that the annotation must be anchored at a particular location within the target document based on the respective target offset values. Each neighboring token provides a vote as to the most likely anchoring position in accordance with its offset value. These likely anchoring positions may be referred to as candidate anchoring position. Each neighboring token provides a candidate anchoring position.

For example, using the illustrated source and target documents 110, 120 of FIGS. 5A and 5B, the neighboring token "quick" in the annotation file at position $p_{quick}$ may be used to make a preliminary assessment that the annotation should be anchored at candidate anchoring position ($p_{quick}+2$) because its corresponding target offset value is +2. Therefore, the candidate anchoring position provided by the neighboring token "quick" is at the word "wolf" in the target document 110 because the word "wolf" appears two words to the right of "quick." Similarly, the token "jumped" may be used to make a preliminary assessment that the annotation should be anchored at candidate anchoring position ($p_{jumped}-1$) because its target offset value is −1.

Therefore, the neighboring tokens produce a plurality of candidate anchoring positions. Because the text of the target document may have changed from the text of the source document, not all of the candidate anchoring positions will be the same. For example, a word may have moved from the end of a sentence to a beginning of a sentence, or a sentence within the target range of the annotation neighborhood may have moved from a location prior to the base token in the source document to a location after the base token in the target document. Although the candidate anchoring positions may not point to the same location in the target document, one position is likely to be reinforced more than the others.

At block 250, the candidate position that aggregates a maximum preference from the neighboring tokens may be selected as the best location for anchoring the annotation (i.e., the anchor location). In one embodiment, a confidence level may also be computed for the various candidate anchoring positions based on the preference aggregation such that an annotation is anchored when a particular confidence level is met or exceeded. Once it has been determined which candidate anchoring position is to be the anchor location, the annotation information may be anchored at such an anchor location within the target document. Therefore, the anchoring method utilizes a topographical search that seeks to maximize the neighboring token approval rating.

In one embodiment, each neighboring token provides a vote corresponding to its candidate anchoring position that is weighted equally amongst all of the votes provided by the neighboring tokens. As such, each neighboring token is evaluated equally in determining the anchor location. In an alternative embodiment, the weight of the vote of each neighboring token is such that the voting power varies across the annotation neighborhood. For example, the neighboring tokens that are closer to the annotation location in the source document may be more likely to point to a candidate anchoring position that matches the correct anchoring location than those neighboring tokens that are further away from the annotation location. Therefore, the voting power of the neighboring tokens may be weighted such that distant neighboring tokens exert only a passing influence in determining the anchor location whereas closer neighboring tokens may exert a stronger influence. A variety of influence functions may be applied to the votes of the neighboring tokens such that the weight of the votes are adjusted accordingly. For example, triangular, normal, Poisson, and/or discrete step functions or distributions may be used for determining the voting power of the neighboring tokens with respect to their position in the annotation neighborhood.

As shown in the example of FIG. 5B, the annotation information comprising the annotation text "Correct animal?" is anchored at the correct word "wolf" although the word "wolf" changed from the word "fox" in the source document. The viewer of the target document may now view an annotation provided by a collaborator that used a separate document and file format to create the annotation. Although the word "fox" changed to "wolf" in the target document, the annotation text "Correct animal" is anchored at the proper location and is therefore presented to the collaborator in the proper context with respect to the surrounding text.

In another embodiment, the annotation metadata may be based on topographic patterns of the documents. The topographic patterns may be document fingerprints that are used to determine the anchor location of a target document. In this embodiment, the topographic patterns contain just enough contextual information such as to let the system discover new contexts within target documents that annotations may apply. Generally, patterns may be identified within the underlying documents and compared to determine potential target documents and anchor locations within those potential target documents. The topographical patterns may be stored as the annotation metadata within the annotation management system database 150.

The topographical patterns may include one or more particular pattern types. For example, topographical patterns may include document patterns, anchor patterns, and/or neighborhood patterns. As will be described in more detail below, embodiments may utilize one or more of these patterns to ascertain anchor locations for annotations within target documents. The document patterns, anchor patterns, and neighborhood patterns are described below in turn.

Document patterns are composed of characteristics of an underlying document, such as document, length, document modified date, file uniform resource identifier (URI), selective shingles within the document, etc. It should be understood that more or fewer characteristics may be utilized. The document patterns may be useful for capturing the context of the document where annotations apply. For example, when new documents with similar characteristics (and therefore similar document patterns) to those of a source document appear, the annotations that apply in context may be selected from the annotation management system database 150 to be displayed within the target document or documents. The annotations that are pulled from the annotation management system database 150 based on a document pattern or patterns of the topographic patterns may or may not be anchored at an anchor location. For example, the annotation may appear at the bottom, top, or margin of a target document.

Document patterns may be generated at any time. In one embodiment, document patterns are generated each time an annotation is made within the source document. Alternatively, a document pattern may be generated each time the source document is saved or appears within a document corpus or the document database.

Consider the following exemplary phrase from a source document:

"A quick brown wolf jumped over the lazy dog. The wolf startled the dog."

Now also consider that an editor of the source document has added the annotation "wilder fox" over the first instance of "wolf" in the above exemplary phrase. A nonlimiting example of document patterns associated with the source document and annotation may be:

| | |
|---|---|
| File: | document 1 |
| Length: | 72 characters |
| Date: | Jul. 29, 2009 |
| vowelshingle1: | aqbw {−14 characters from the annotation start, −18 characters from the annotation end} |
| vowelshingle2: | otld {13 characters from the annotation start, 9 characters from the annotation end} |

The vowel shingle utilized above is just one example of a type of document shingle that may be employed. Vowel shingles are document shingles that are selectively created based on words within the document that start with a vowel. For example, vowelshingle1 is a shingle that starts with the first word beginning with a vowel that proceeds the annotation location. In the above example, the word "A" is the first word that starts with a vowel. Vowelshingle1 consists of the first letter of the word "A" and the first letter of the three subsequent words. Similarly, vowelshingle2 is a shingle that is based on the word "over." It should be understood that other document shingle types may be utilized.

When a second document appears (i.e., a potential target document), the system may also extract document patterns from the second document. For example, the second document may contain a passage that reads:

"A quick brown wolf jumped over the lethargic dog. The dog was started by the wolf."

The above passage is semantically similar to the passage provided above with respect to the first document, but is structurally different. As an example and not a limitation, a document pattern for the second document may be configured as:

| File: | document 2 |
| --- | --- |
| Length: | 84 characters |
| Date: | Jul. 30, 2009 |
| vowelshingle1: | aqbw {at position 0} |
| vowelshingle2: | otld {at position 32} |

As may be seen above, the document pattern for the second document also records the vowel shingles within the document. In this instance, the position of the document shingles within the second document are recorded. The document patterns for all documents may be stored as the annotation metadata in the form of topographic patterns.

Based on a comparison between the vowel shingles and other document patterns of the first, source document and the second, target document the system is able to validate the annotation in the new context of the second, target document. For example, the comparison of the document patterns may yield a document similarity value that is then compared with a threshold document similarity value. The annotation may be validated if the generated document similarity value is greater than or equal to the threshold document similarity value. The system may not know the exact location where to anchor the annotation, however. Therefore, the annotation may be placed at some other location within the second, target document.

Topographic patterns may also include anchor patterns that aid in determining the location as to where the annotation should be anchored in the target document. As stated above, annotations are typically made on specific selections of text. Such text selections may be deemed as anchor locations. Some annotation, devoid of the document patterns, always tether with some anchor text. Anchor patterns capture the characteristics of the selected subtext over which an annotation is anchored (i.e., the annotation location). Anchor patterns are characteristics of the anchor location text that, no matter what, can nominate sub-texts of documents as anchor location candidates. For example, where the term "IBM" is annotated with "International Business Machines" in a particular source document, "IBM" is also "International Business Machines" in the context of many other documents even though such other documents are not structurally or semantically similar to the source document.

As an example and not a limitation, anchor patterns for the above example of the source document regarding the wolf may appear as follows:

| annotated word: | wolf |
| --- | --- |
| firstchar: | w |
| length: | 4 |

Anchor patterns provide information regarding the word or sub-text of words that the particular annotation is associated with. In the above example, the annotated word is "wolf," the first character of the annotated word is "w," and the length of the annotated word is four characters. Any one or more of these parameters may be used to aid in determining the anchor location in a target document. For example, the last character of the word may also be used.

Next, anchor patterns for the second document may be generated when it appears. Anchor patterns for the second document may be configured as follows:

| A: | {position: 1; length 1; lastchar: a} |
| --- | --- |
| quick: | {position: 3; length 5; lastchar: k} |

-continued

| ... | |
| --- | --- |
| wolf: | {position: 16; length 4; lastchar: f} |
| ... | |
| wolf: | {position: 80; length 4; lastchar: f} |

The system may compare the anchor patterns of the second, target document to the anchor patterns of the first, source document to determine potential anchor locations. An anchor similarity value may be generated and compared with a threshold anchor similarity value. Based on the above anchor patterns, the system may deduce that the anchor location in the new context of the second document may possibly be at positions 16-20 (the first appearance of the word "wolf," which is a four character word) or at positions 80-84 (the second appearance of the four character word "wolf"). Depending on the rules programmed into the system, the annotation may be located at both of these instances or at one instance, for example. However, it is not known exactly where the annotation is to be anchored.

Topographic patterns may further include neighborhood patterns that aid in pinpointing the actual location as to where the annotation should be anchored in the target document by capturing the characteristics of the immediate vicinity preceding and following the annotation location in the source document. Neighborhood patterns may comprise shingles associated with text that occur before and after the annotation location in the source document. As an example and not a limitation, shingles may be generated for words that occur a predetermined distance from the annotation location in a similar manner as described above with respect to the neighboring tokens (e.g., five words before the annotation location and five words after the annotation location).

When document patterns match, and if multiple anchor patterns are recognized as likely anchor location candidates in the context of a second, target document after comparing anchor patterns, neighborhood patterns may help to break a tie amongst the anchor patterns and select the anchor pattern that is most likely associated with the proper anchor location.

As an example and not a limitation, neighborhood patterns for the above "wolf" text passage example for the first, source document may be as follows:

| shingle1: | aqbw {−14 characters from the annotation start, −18 characters from the annotation end} |
| --- | --- |
| shingle2: | otld {−14 characters from the annotation start, −18 characters from the annotation end} |
| shingle3: | wjot {0 characters from the annotation start, −4 characters from the annotation end} |
| shingle4: | twst {32 characters from the annotation start, 28 characters from the annotation end} |

It should be understood that more or fewer shingles may be generated as the neighborhood patterns and the above is just one example.

In this example, there are two anchor patterns that point to potential anchor locations within the second, target document: position 16-20 and position 80-84. As an optional step, neighborhood patterns for positions 16-20 and 80-84 of the second, target document may be generated to aid in determining the exact anchor location. As an example and not a limitation, neighborhood patterns for the second, target document may be as follows:

| Position 16, wolf: | |
| --- | --- |
| shingle1: | aqbw {position 1} |
| shingle2: | qbwj {position 3} |
| shingle3: | bwjo {position 10} |
| shingle4: | wjot {position 16} |
| shingle5: | jotl {position 21} |
| shingle6: | otld {position 28} |
| Position 80, wolf: | |
| shingle1: | sbtw {position 64} |
| shingle2: | <EOF> |

The system may compare the above shingles of the neighborhood patterns for position 16 and 80 with the shingles of the neighborhood patterns associated with the source document, respectively, and determine that more neighborhood patterns for position 16 match with the neighborhood patterns captured with the original context of the source document. Therefore, between a contest of position 16 and position 80 in the new context of the second, target document, position 16 wins. The system, with probabilistic confidence of similarly (e.g., neighborhood similarity value or values), may then anchor the annotation to position 16. In this manner, the document patterns, anchor patterns, and neighborhood patterns may be utilized to determine the anchor locations within target documents with a high level of confidence.

Still referring to the above example regarding the wolf, assume that a third document is introduced that contains the following passage:

"wolf is a member of a pack. Wolves hunt in packs."

The system may directly compute the document patterns as described above. Because the document patterns of this third document do not match those of the first, source document, the annotation is not pulled from the annotation database. However, the system may optionally move on to the second step of identifying anchor patterns, such as "{word: wolf{position 1, length: 4, last char: f}}," which matches the annotation's anchor pattern of the first, source document. However, in the step of generating neighborhood patterns, the neighborhood patterns also do not match. Regardless, if the programming rules of the system permit, the system may simply anchor that annotation at the word wolf at position 1. This in an exemplary case where one pattern is used to match context and exhibit how only one of the three type of topographic patterns may be used in isolation.

As described above, the methods described herein may be implemented as one or more software programs comprising computer executable code residing in a computer. The processor of a computer device such as a personal computer may execute the computer executable code to perform the computer-implemented annotation methods described herein above. Collaborators may access the computer executable code locally on respective computer devices or remotely such as in a cloud computing system to share annotation information between various documents.

It should now be understood that the embodiments described herein may compare two or more documents with one another to determine whether the documents are compatible irrespective of metadata that may or may not link the documents. Embodiments may create a document signature in the form of document shingles for a particular document that may then be compared with document signatures of other documents to determine compatibility. Document shingles and annotation metadata may be stored separately from a document file such that annotation information from various source documents may be anchored into a target document. Neighboring tokens of the annotation metadata may be used as heuristic topographic landmarks for determining the proper location in which to anchor one or more annotations from one or more source documents. Topographic patterns may also be generated for documents and compared to determine anchor locations within target documents. Hence, a user or collaborator working on an electronic document within a collaboration group or forum may be presented with compatible electronic documents of which annotations may be shared. Annotations of compatible documents may be shared and anchored at proper locations so that collaborators may view the relevant annotations created by the others within the collaboration forum. The annotations may be anchored at the proper locations within the target documents despite differences in content between the documents as well as differences in file-format.

It is noted that the term "substantially" may be utilized herein to represent the inherent degree of uncertainty that may be attributed to any quantitative comparison, value, measurement, or other representation. These term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method of annotating an electronic document comprising:
   receiving annotation information corresponding to an annotation of a first electronic document file at an annotation location, wherein the first electronic document file is a text document;
   generating annotation metadata associated with the annotation information by creating topographic patterns from text of the first electronic document file and the annotation information, wherein the topographic patterns include one or more document patterns, one or more anchor patterns, one or more neighborhood patterns, or combinations thereof;
   storing the annotation information and associated annotation metadata in an annotation file that is separate from the first electronic document file;
   generating topographic patterns from text of a target electronic document file, wherein:
   the topographic patterns include document patterns, anchor patterns, neighborhood patterns, or combinations thereof, and the target electronic document file is a modified version of the first electronic document file such that an underlying text of the target electronic document file is different from an underlying text of the first electronic document file;
   the document patterns include a document name, a document length, a document date, document shingles, or combinations thereof;
   the anchor patterns of the first electronic document file include a word or a text associated with the annotation located in the first electronic document file, a first character of the word or the text, a last character of the word or the text, a word or text length, or combinations thereof;
the anchor patterns of the target electronic document file include a plurality of words associated with the target electronic document file, wherein characteristics of each word include a position of the word within the target electronic document file, a length of the word, a first character of the word, a first character of the word, or combinations thereof;
the neighborhood patterns of the first electronic document file comprise a plurality of document shingles associated with the annotation location in the first electronic document file; and
the neighborhood patterns of the target electronic document file comprise a plurality of document shingles associated with one or more potential anchor locations;
comparing the topographic patterns of the first electronic document file to the topographic patterns of the target electronic document file to determine an anchor location within the target electronic document file; and
anchoring the annotation information, by a computer device, to the target electronic document file at the anchor location within the text of the target electronic document file.

2. The computer-implemented method of claim 1 wherein:
comparing the topographic patterns of the first electronic document file to the topographic patterns of the target electronic document file further comprises:
comparing the document patterns of the first electronic document file with the document patterns of the target electronic document file to generate a document similarity value; and
comparing the document similarity value with a threshold document similarity value; and
the computer-implemented method further comprises adding the annotation information to the first electronic document file when the document similarity value is greater than the threshold document similarity value.

3. The computer-implemented method of claim 2 wherein:
comparing the topographic patterns of the first electronic document file to the topographic patterns of the target electronic document file further comprises comparing the anchor patterns of the first electronic document file to the anchor patterns of the target electronic document file to determine one or more potential anchor locations;
when there is one potential anchor location, anchoring the annotation information to the target electronic document file at the potential anchor location; and
when there is more than one potential anchor location, comparing the neighborhood patterns of the first electronic document file with the neighborhood patterns of the target electronic document file, and anchoring the annotation information to the potential anchor location having neighborhood patterns that are most similar to the neighborhood patterns of the first electronic document file.

4. A computer-implemented method of annotating an electronic document comprising:
receiving annotation information corresponding to a first electronic document file, wherein the first electronic document file is a text document;
creating annotation metadata that is associated with the annotation information and comprises contextual information relating to an annotation location in the first electronic document file, wherein:
the annotation metadata is created by assigning a target offset value to neighboring tokens defining an annotation neighborhood, wherein the target offset values correspond to positions of the neighboring tokens with respect to the annotation location within the first electronic document file;
the neighboring tokens comprise words within the first electronic document file;
the target offset value of a particular neighboring token represents a number of words from which the particular neighboring token is separated from the annotation location; and
the target offset value of each neighboring token provides a candidate anchoring position;
storing the annotation information and associated annotation metadata in an annotation file that is separate from the first electronic document file; and
anchoring, by a computer device, the annotation information to a target electronic document file at an anchor location corresponding to the annotation metadata, wherein the target electronic document file is a modified version of the first electronic document file such that an underlying text of the target electronic document file is different from an underlying text of the first electronic document file, wherein anchoring the annotation information further comprises:
evaluating the candidate anchoring positions such that a weight of each candidate anchoring position is determined at least in part on an influence function;
selecting the candidate anchoring position having a maximum preference from the neighboring tokens as the anchor location; and
anchoring the annotation information at the anchor location within the target electronic document file.

5. The computer-implemented method of claim 4, wherein neighboring tokens positioned in a first direction from the annotation location are assigned a positive target offset value and neighboring tokens positioned in a second direction from the annotation location are assigned a negative target offset value.

6. The computer-implemented method of claim 4, wherein:
the neighboring tokens comprise characters within the first electronic document; and
the target offset value of a particular neighboring token represents a number of characters from which the particular neighboring token is separated from the annotation location.

7. A computer-implemented method of annotating an electronic document comprising:
receiving annotation information corresponding to a first electronic document file, wherein the first electronic document file is a text document;
creating annotation metadata that is associated with the annotation information and comprises contextual information relating to an annotation location in the first electronic document file, wherein:
the annotation metadata is created by assigning a target offset value to neighboring tokens defining an annotation neighborhood, wherein the target offset values correspond to positions of the neighboring tokens with respect to the annotation location within the first electronic document file;

the target offset value of each neighboring token provides a candidate anchoring position;
a base token is associated with the annotation location;
a magnitude of the target offset value of the base token is less than the magnitude of each of the remaining target offset values associated with the remaining neighborhood tokens; and
the magnitude of the target offset value of a neighboring token that is located relatively further from the annotation location is greater than the magnitude of the target offset value of a neighboring token that is located relatively closer to the annotation location;
storing the annotation information and associated annotation metadata in an annotation file that is separate from the first electronic document file; and
anchoring, by a computer device, the annotation information to a target electronic document file at an anchor location corresponding to the annotation metadata, wherein the target electronic document file is a modified version of the first electronic document file such that an underlying text of the target electronic document file is different from an underlying text of the first electronic document file, wherein anchoring the annotation information further comprises:
evaluating the candidate anchoring positions such that a weight of each candidate anchoring position is determined at least in part on an influence function;
selecting the candidate anchoring position having a maximum preference from the neighboring tokens as the anchor location; and
anchoring the annotation information at the anchor location within the target electronic document file.

8. The computer-implemented method of claim 7, wherein:
the neighboring tokens comprise words within the first electronic document file; and
the target offset value of a particular neighboring token represents a number of words from which the particular neighboring token is separated from the annotation location.

9. The computer-implemented method of claim 7, wherein neighboring tokens positioned in a first direction from the annotation location are assigned a positive target offset value and neighboring tokens positioned in a second direction from the annotation location are assigned a negative target offset value.

10. The computer-implemented method of claim 7 wherein:
the neighboring tokens comprise characters within the first electronic document; and
the target offset value of a particular neighboring token represents a number of characters from which the particular neighboring token is separated from the annotation location.

* * * * *

UNITED STATES PATENT AND TRADEMARK OFFICE
CERTIFICATE OF CORRECTION

PATENT NO. : 10,007,650 B2
APPLICATION NO. : 14/995581
DATED : June 26, 2018
INVENTOR(S) : Narasimha R. Edala et al.

Page 1 of 1

It is certified that error appears in the above-identified patent and that said Letters Patent is hereby corrected as shown below:

In the Claims

Column 19, Line 9, Claim 1 change "a first character of the word, a first character of the word, or combinations thereof" to --a first character of the word, or combinations thereof--

Signed and Sealed this
Eleventh Day of September, 2018

Andrei Iancu
*Director of the United States Patent and Trademark Office*